United States Patent [19]

Anderson et al.

[11] Patent Number: 5,065,650

[45] Date of Patent: Nov. 19, 1991

[54] HAND TOOL

[75] Inventors: J. Edward C. Anderson, Moreland Hills; James R. Jeromson, Jr., Aurora, both of Ohio

[73] Assignee: Milbar Corporation, Chagrin Falls, Ohio

[21] Appl. No.: 675,312

[22] Filed: Mar. 26, 1991

Related U.S. Application Data

[60] Division of Ser. No. 378,448, Jul. 10, 1989, Pat. No. 5,007,313, which is a continuation of Ser. No. 182,016, Apr. 29, 1988, abandoned, which is a continuation-in-part of Ser. No. 46,851, May 7, 1987, abandoned.

[51] Int. Cl.[5] .............................................. B23P 19/04

[52] U.S. Cl. .............................................. 81/486; 81/485; 81/302; 29/229

[58] Field of Search ................. 81/485, 486, 302, 416, 81/417, 393, 394, 405–407; 29/229, 225

*Primary Examiner*—D. S. Meislin

*Attorney, Agent, or Firm*—Watts, Hoffmann, Fisher & Heinke Co.

[57] ABSTRACT

A hand tool including a pair of levers each including a handle portion, a jaw portion and a boss portion interconnecting the handle and jaw portions, with the levers being pivotally interconnected for normally permanently intended but relatively movable relationship. The lever sections are pivotally interconnected together for manipulation between internal and external tool operating positions. Movement between the internal and external positions is provided by work position selection structure positioned on the levers, and including guiding and stopping structure for selectively guiding the tool between operating positions and stopping tool movement in the proper operating position.

7 Claims, 1 Drawing Sheet

HAND TOOL

CROSS REFERENCES

This application is a division of application Ser. No. 07/378,448 filed July 10, 1989 entitled "Hand Tool" now U.S. Pat. No. 5,007,313. That application was a continuation of Ser. No. 07/182,016 filed Apr. 29, 1988 which was, in turn, a continuation-in-part of Ser. No. 07/046,851 filed May 7, 1987, the latter two both being abandoned.

TECHNICAL FIELD

This invention relates to a hand tool of the type used for expansion and/or contraction of differing types of deformable members.

BACKGROUND ART

Snap or retaining rings are either "internal" or "external". The internal type of retaining ring is used to retain elements such as bearings or shafts, within a bore. In order to install the ring it is contracted to allow it to pass into the bore, and then allowed to expand for engagement with an internal groove formed around the bore. The external type of retaining ring is used to retain elements such as bearings, gears or pulleys on shafts. An external ring normally engages an annular groove formed in a shaft to inhibit axial movement of an element mounted on the shaft. An external ring is installed by expanding the ring until its internal diameter is greater than the shaft diameter.

The tools typically used for installing and removing internal and external rings are substantially different. A tool for installing and removing external rings, for example, must expand the ring to increase its internal diameter in order to accommodate the shaft. An internal ring installation and removal tool, however, must contract the ring in order to decrease its external diameter to enable the ring to pass through a bore. Since the function and performance required of such tools is so substantially different, retaining ring pliers are often supplied as single purpose "internal" and "external" tools. These single purpose pliers are intended for use only in installing or removing one type of retaining ring, and both types of pliers are therefore required in order to install or remove both external and internal types of retaining rings.

One solution to the provision of a tool suitable for either internal or external rings has been the provision of convertible tools capable of switching between internal and external positions. These required manipulation of interconnected pieces, movement of a linkage arrangement mounted on the tool or disassembly of jaw and/or handle sections in order to accomplish the conversion.

One such convertible tool, known as a universal plier, is illustrated in U.S. Pat. No. 4,625,379. The tool includes a pair of pivotally interconnected handles and a pair of jaw members coupled to the handles by a latching mechanism having two transversely slidable latch members. In one position, the latch members are positioned to allow one handle member to be coupled to one jaw member and the other handle to be coupled to the other jaw member. Upon transversely sliding the latch members to a second position, the one handle is coupled to the other jaw member and the other handle is coupled to the one jaw member. While the construction of the referenced patent has enjoyed great success, it is relatively complex and it contains numerous parts which must be properly assembled and aligned during operation to provide proper functioning. In a substantially different construction, a plier is provided whereby separate pairs of jaws and handles are pivotally interconnected about a common axis and are arranged such that a pair of movable pins is adapted to alternately engage the jaw and handle pairs to shift the jaw and handle interconnections from an internal position to an external position and visa versa.

An additional form of plier construction provides interconnected levers having two jaw members for simultaneous operation of the tool on internal and external retaining rings by a pair of jaws positioned for internal operation and a pair of jaws for external operation.

Another convertible plier construction utilizes linkages that must be disengaged and the tool reassembled in order to change the relationship between the handles and jaws. Such a construction is cumbersome to use as it requires unneeded preparation time prior to use, and may alter the configuration of the tool such that it becomes uncomfortable to use. In addition at least some such tools have significantly different mechanical advantages in the internal and external positions.

A proposed tool provided handles which were intended to be relatively moveable between internal and external positions. To accomplish this one lever included a U-shaped slot and the other carried a pivot which projected through the slot. Presumably the levers can be moved from a crossed internal ring relationship with the pivot at one end of the slot to a side by side external ring relationship. If the proposed tool was operable at all, it lacked structure to maintain the levers in a selected relationship when in use.

SUMMARY OF INVENTION

The present invention provides a new and improved hand tool for removing and installing internal and external retaining rings. The tool includes two levers permanently connected together which nonetheless may be easily switched between internal and external operating positions.

The tool comprises right and left operating lever sections pivotally interconnected together with driving structure for shifting the lever sections between tool operating positions. Each of the lever sections includes a jaw portion, a handle portion and a boss portion intermediate the jaw and handle portions. The pivotal interconnection of the lever sections is perpendicular to and intersects an imaginary center line which bisects the tool.

The interconnection of the lever sections and position of the jaw and handle portions of the lever sections is configured in a side by side relationship during operation of the tool in the external position. Thus, both the jaw and handle portions of the one lever section operate on one side of the center line, while the jaw and handle portions of the lever are on the other side of the center line. When in the internal operating position, the portions are crossed such that the jaw and handle portions of the one lever operate on opposite sides of the center line, and the jaw and handle portions of the other lever are also opposite one another relative to the center line.

One lever section is coupled to a driving knob. The other lever section is coupled to a driving knob. The other lever section is connected to the knob by a pin and movable relative to the one lever section and knob.

Manual rotation of the knob shifts the lever sections between an external position to opposite sides of the center line in their side by side relationship and a crossed internal ring relationship.

The driving knob comprises a drawn cup-shaped member having an annular side wall, a bottom portion supporting the knob on the one lever section, and a cap member engaged with the annular wall and supported within the cup member. A pivot secures the knob and the one lever section together.

The one lever section includes an arcuate groove for engagement with the pin in a work position establishing relationship. The one lever also includes a recessed aperture for receiving a head of the pivot in a flush working relationship. Rotation of the knob about the pivot results in coaction of the knob, the pivot, the pin and the groove causing eccentric relative lever movement so that one jaw tip passes by the other. As the knob is rotated, the pin functions as a driving connection traveling within the lever groove over an arc of 180° or more. The levers thus move from one position, and arrive at the other position when the driving connection reaches the other end of the groove path. Upon contacting the other end of the groove, the driving connection serves as a stop member for stopping rotation of the tool in the proper operating position.

The tool of the present invention preferably includes a spring interposed between the lever handle portions for biasing the handles away from one another. Use of the spring results in the handle portions often being biased to their farthest extension.

With the present tool, a raised stop limit on the other lever section is also used to limit the farthest handle extension when the tool is in the internal position. The stop limit engages the boss portion of the one lever section to prevent handle movement past a maximum open position.

These and other features and advantages of the present invention will be had by referring to the following description and claims taken in conjunction with in the accompanying drawings.

BEST MODE FOR CARRYING OUT THE INVENTION

Figure 1:
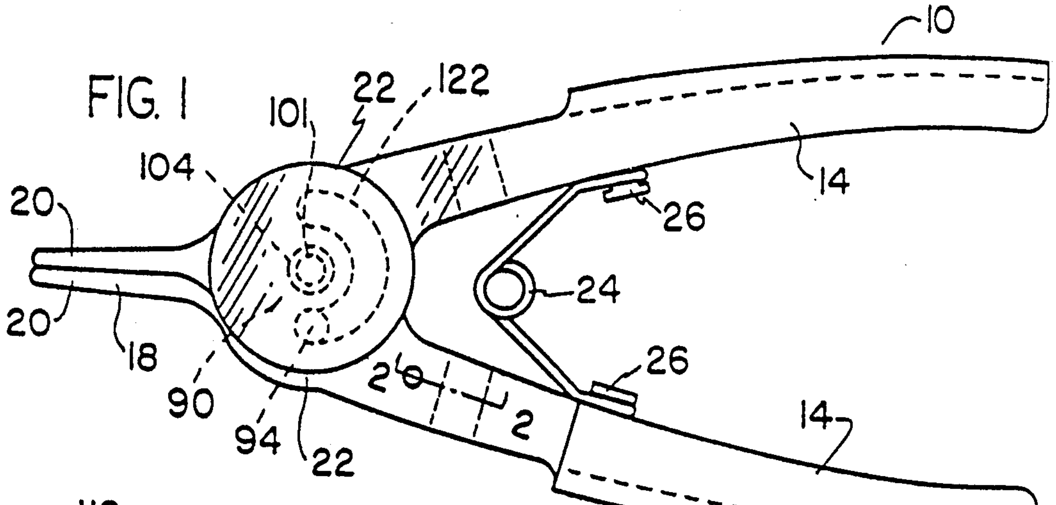
FIG. 1 is plan view of the plier tool of the present invention in the external closed position.
Figure 2:
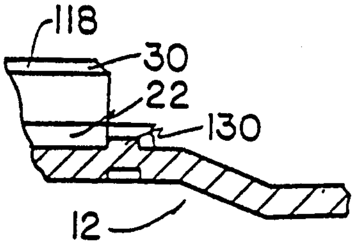
FIG. 2 is a partial sectional view of an internal-open position stop limit taken along the line 2—2 of FIG. 1.
Figure 3:
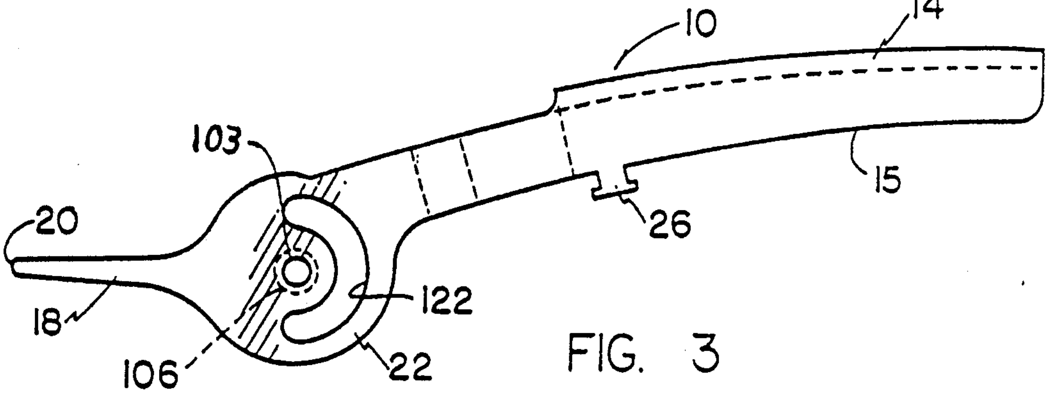
FIG. 3 is a plan view of the one lever of the plier tool of FIG. 1; and, FIG. 4 is an enlarged partial sectional view of the driving structure of the plier tool of FIG. 1.

Referring to FIGS. 1 to 4, the hand tool of the present invention is illustrated. The hand tool includes a pair of lever sections 10, 12 each having a handle portion 14, covered by plastic grip covers 15. The lever sections also include jaw portions 18 having tips 20, and boss portions 22. The boss portions lever sections are pivotally interconnected about a driving pin or connection 90, which couples the lever sections 10, 12 and a driving knob 30.

The driving connection 90 is in the form of a rivet peened over at 94. The knob 30 and lever sections 10, 12 are connected by the rivet 90 through respective aligned apertures 95, 96 and 97. A pivot connection 100 interconnects the one lever section 10 with the driving knob 30.

Figure 4:
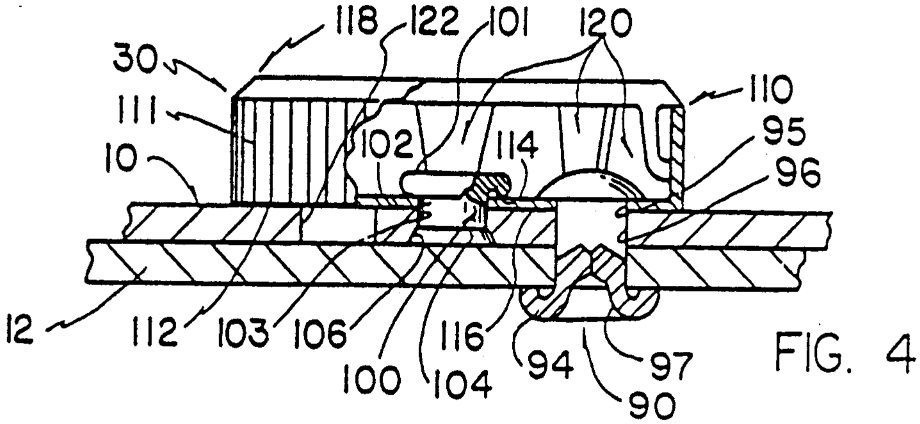

The pivot and driving connections 100, 90, are best illustrated in FIG. 4. The pivot connection 100 includes a rivet 101 which engages the knob 30 and one lever section 10 through respective aligned apertures 102, 103. Both the driving and pivot connection rivets 90 and 101 may be surrounded by spring washers (not illustrated) to inhibit unintentional tool movement, and assist in maintaining the tool in the selected operating position.

The rivet 101 includes a countersunk head portion 104 for engagement with a recessed portion 106 of the aperture 103 in the one lever section 10. The one lever section 10 and pivot connection 100 are flush lever section 10, as shown in FIG. 4, to avoid interference with the lever section 12 which abuts the one lever section and rivet 101.

The driving knob 30 comprises a drawn cup-shaped member having an annular side wall 110 with an outer knurled finger-engaging surface 111. The knob 30 also has a bottom portion 112 with an inner surface 114 and an outer surface 116 engaging the one lever section 10'. The driving knob 30' also includes a cap member 118 having a plurality of finger-like portions 120 for engaging with the annular side wall 110 to support and secure the cap member 118 within the cup member.

The one lever section 10 further includes an arcuate groove 122 for engagement with the driving connection 90 in a work position establishing relationship. Movement of the tool between positions is thus provided by manual rotation of the knob which moves the driving connection 90 along the lever groove following the arcuate path 122 over an arc of 180° or more. By grasping the knob on the knurled surface 111 and selectively rotating the knob, the other lever section 12 moves in eccentric relation with respect to the interconnected knob 30 and one lever section 10. The levers 10, 12 thus move from one position, and arrive at the other position when the driving connection reaches the other end of the groove. Upon contacting the other end of the groove, the driving connection rivet 90 serves as a stop member for stopping rotation of the tool in the selected operating position. The lever handle 12 includes a stop 130 for abutting the knob 30 in the external operating position to thereby prevent the connecting pin from moving inwardly along the driving aperture and out of the external operating position.

The present invention thus provides an inexpensive tool for the expansion and contraction of resilient retaining members. The tool is easily switched between the internal and external operating modes by merely manipulating the shifting or driving structure 28.

The lever sections of the tool illustrated are constructed from stampings, the making of which is known by those skilled in the art. It should also be recognized that other relatively inexpensive methods of manufacture could be used to produce the disclosed tool components, such as using powdered metal technology.

From the above it will be apparent that a novel and improved hand tool has been provided. While preferred embodiments of this invention have been described in detail, it will be apparent that certain modifications or alterations can be made therein without departing from the spirit or scope of the invention set forth in the appended claims.

We claim:

1. A plier tool for installing or removing internal or external retaining rings or the like comprising:

a) first and second operating levers;

b) said levers each having a jaw portion, each jaw portion includes a tip for engagement with retaining rings;

c) said levers each further including a handle portion and a boss section between the jaw and handle portion of the same lever;

d) an actuating knob for moving said tool between internal lever crossed and external lever side by side operating positions including a finger-grasping portion, a driving aperture, and a connecting aperture;

e) the boss section of one of the levers having a connecting aperture and a driving aperture;

f) a driving pin for position control engagement with walls defining said lever driving aperture, walls defining said knob driving aperture and the other of said levers;

g) a connecting pin for coupled engagement with the knob and the connecting aperture of said one lever;

h) said driving pin interconnecting said knob and the other lever for rotational guiding and stopping engagement with walls of said boss section driving aperture; and i) said other lever being movable relative to said one lever, whereby in an internal operating position said levers are crossed and upon selective rotation of said knob, said levers move to a side by side external position.

2. The plier tool of claim 1 wherein said other lever handle portion includes a stop limit for abutting said knob in the external operating position and thereby preventing the connecting pin from moving inwardly along the driving aperture and out of the external operating position.

3. A reversible plier tool for installing or removing internal or external retaining rings or the like comprising:

a) a pair of lever sections each having a handle portion, and a boss portion situated intermediate the handle portion and the jaw portion;

b) a driving knob;

c) a driving structure including a pivot connection and a driving connection, the driving connection interconnects the lever sections and the driving knob, the pivot connection interconnects the knob and one of said levers, the connections permitting movement of the lever sections between a first working position in a crossed relationship and a second working position in said a side by side relationship and return; and d) a groove in one of said lever sections for engagement with the driving connection in a work position establishing relationship, whereby movement of the tool between positions is provided by rotation of the driving knob which moves the driving connection along the groove.

4. A snap ring plier tool comprising;

a) first and second levers each including handle, boss and jaw portions;

b) a control knob;

c) first and second pivots respectively connecting the knob to the first and second boss portions at locations such that the axis of the first pivot is radially offset from the axis of the second pivot; and d) the second boss portion including an opening through which the first pivot projects and surfaces for coaction with the first pivot to limit relative jaw movement on rotation of the knob to move the levers relatively from an internal to an external ring orientation and return to the internal ring orientation.

5. The plier of claim 4 wherein the knob includes a drawn cup and a cap.

6. A snap ring plier tool comprising:

a) first and second levers each including handle and jaw portions interconnected by a boss portion;

b) the first lever boss portion including a central aperture and a concentrically disposed arcuate groove of at least 180° circumferential extent;

c) a knob in the form of a cup having central aperture and a radially spaced aperture;

d) a fastener extending through the central apertures and connecting the cup to the first lever in relatively rotatable relationship;

e) a position control extending through the spaced aperture, the groove and a second lever boss aperture and connecting the second lever to the knob with the first lever boss there between;

f) the levers being shiftable from a side by side external ring position to a crossed internal ring position and from the internal position to the external position upon rotation of the knob; and, g) the position control being coactable with ends of the groove selectively and one at a time to locate the levers in the internal and external positions respectively.

7. The tool of claim 6 wherein a cap closes the knob.

* * * * *